[11] 3,587,737

[72] Inventor William C. Tosch
    Parker, Colo.
[21] Appl. No. 874,169
[22] Filed Nov. 5, 1969
[45] Patented June 28, 1971
[73] Assignee Marathon Oil Company
    Findlay, Ohio

[54] PREVENTION OF SALT WATER ENCROACHMENT INTO FRESH WATER AQUIFERS
    7 Claims, 2 Drawing Figs.
[52] U.S. Cl................................................ 166/252,
    166/275, 166/294
[51] Int. Cl................................................ E21b 33/138
[50] Field of Search............................................ 166/268,
    275, 273, 274, 305, 285, 292, 294, 252

[56] References Cited
    UNITED STATES PATENTS
    3,148,730  9/1964  Holbert........................ 166/274
    3,152,640  10/1964 Marx............................ 166/305X(D)
    3,254,714  6/1966  Gogarty et al................. 166/274
    3,297,085  1/1967  Herring........................ 166/273
    3,380,522  4/1968  Payne, Jr. et al............. 166/268
    3,400,761  9/1968  Latimer, Jr. et al.......... 166/294X
    3,406,754  10/1968 Gogarty........................ 166/273
    3,455,389  7/1969  Gogarty........................ 166/274

Primary Examiner—Stephen J. Novosad
Attorneys—Joseph C. Herring, Richard C. Wilson, Jr. and Jack L. Hummel ABSTRACT: The advance of saline water into fresh water aquifers is inhibited by injecting into the aquifer, preferably in advance of the intruding salt water, a micellar solution comprising preferably a low equivalent weight petroleum sulfonate. Such a micellar solution, inter alia, becomes viscous upon contact with saline water and inhibits the further encroachment of additional saline water.

ORIGINAL FRESH WATER AQUIFER--NOW INVADED BY SALT WATER

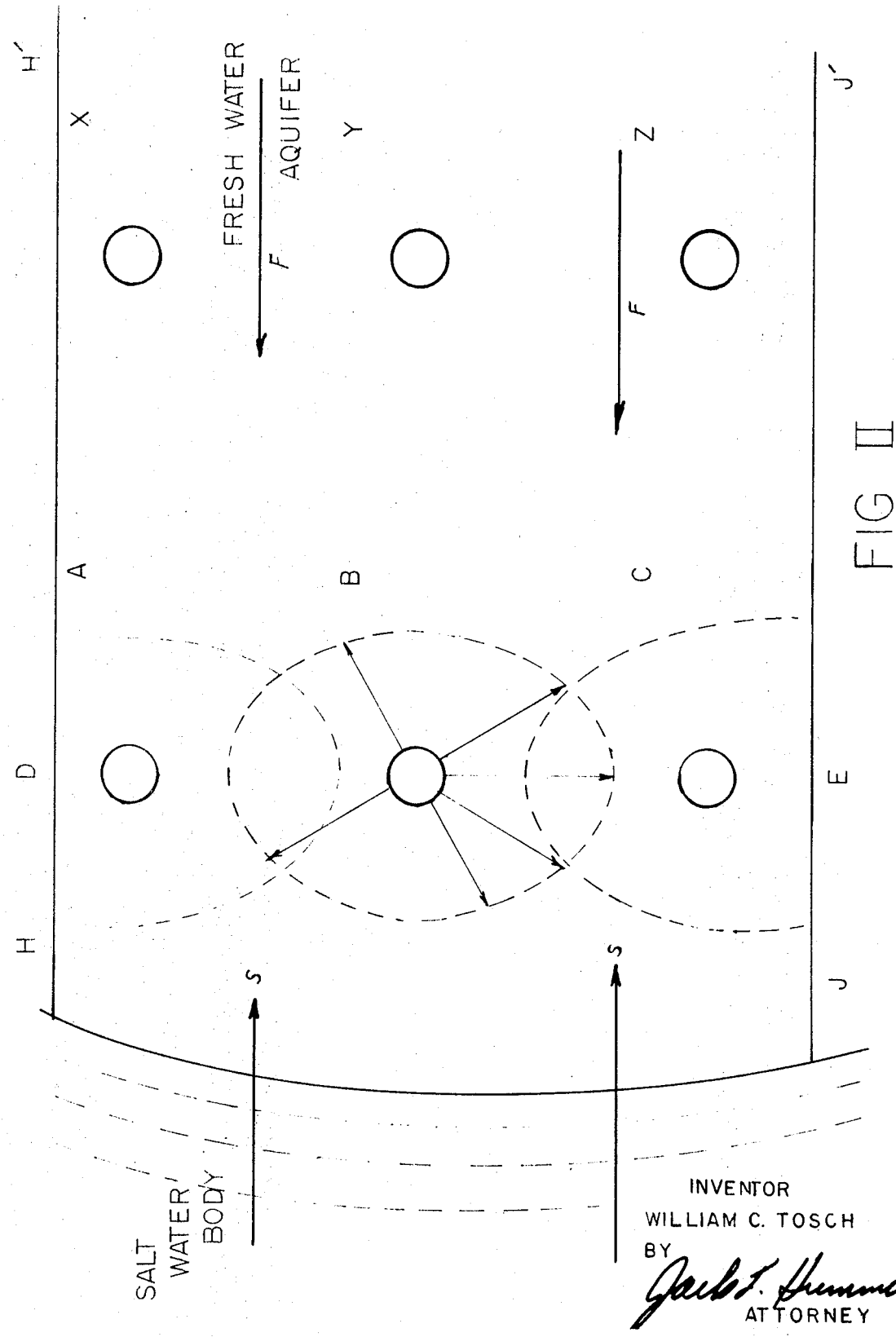

PREVENTION OF SALT WATER ENCROACHMENT INTO FRESH WATER AQUIFERS

BACKGROUND OF THE INVENTION

1. Field of the Invention

This invention relates to inhibiting salt water encroachment into fresh water aquifers. This is accomplished by injecting into the aquifer a micellar solution which has the capability of becoming a viscous liquid upon contact with saline water. The viscous liquid inhibits the advance of the saline water.

2. Description of the Prior Art

In many areas contiguous to salt water bodies, e.g. Southern California, fresh water is being pumped from subterranean formations (e.g. aquifers) at a rate faster than it can be regenerated, thereby lowering the water tables and allowing saline waters from adjacent salt water bodies to enter the fresh water aquifers. Thus saline water is permitted to flow inland to replace the displaced fresh water. The inflowing saline waters mix with the fresh waters, rendering them brackish and unsuitable for certain uses.

The intrusion of saline water into fresh water aquifers takes place gradually, however once saline water has intruded, it is seldom possible to effectively repulse its detrimental effects.

Salt water intrusion can occur when the fresh water level in the aquifer drops, thereby lowering the fresh water table and permitting saline water to flow into the aquifer's remaining fresh water. Also, lowering the fresh water level can lower the hydrostatic head of the fresh water below that of the saline water, resulting in the saline water displacing and contaminating the fresh water.

The prior art teaches, in U.S. Pat. No. 3,380,522, a method of stopping the horizontal advance of saline water into a fresh water aquifer by injecting into the aquifer a slurry containing granular materials such as reclaimed oil well drilling mud and sedimentary clay from the ocean floor. The patent claims that such materials form an impermeable bridging mass in the aquifer and thereby block the intruding saline water.

DESCRIPTION OF THE DRAWINGS

FIG. 2 is a diagrammatic plan view of the invention illustrating a typical application thereof.

In FIG. 1 a fresh water aquifer H–H'—I–I' is illustrated. The aquifer is labeled H–H'—J–J' in the plan view. The aquifer may be of any type of water bearing and/or conducting formation with the arrow indicating the normal direction of flow of fresh water in the aquifer.

Figure 1:
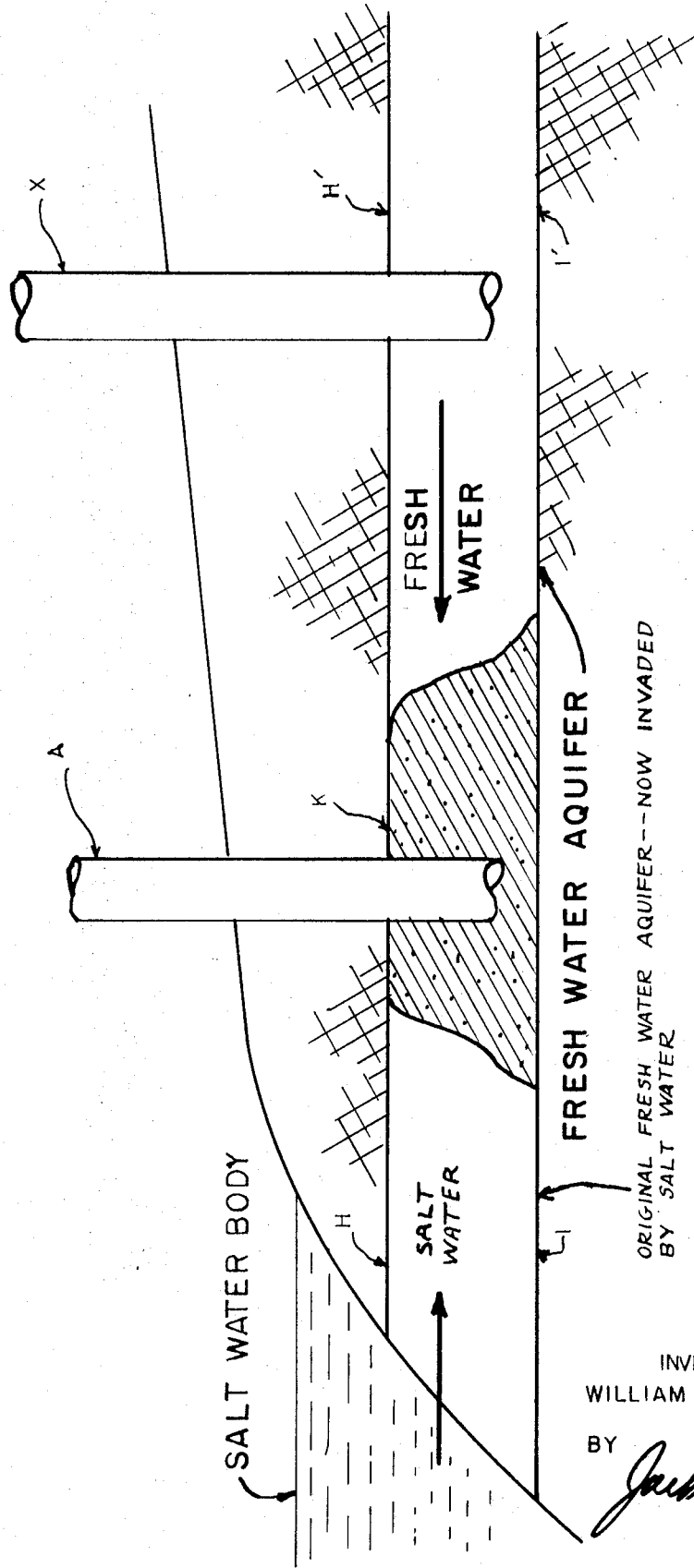
FIG. 1 is a sectional view of an earth formation having a fresh water aquifer, a body of saline water related thereto and a cutoff established therein in accordance with this invention.

This invention establishes an impermeable or substantially impermeable dam or cutoff K extending transversely in or across the aquifer along the line DE in FIG. 2. That is, transverse to the direction of flow of water therethrough.

The damming or cutoff structure K is established in the aquifer by introducing and depositing a micellar solution into the aquifer. Letters A, B, C represent typical water pumping wells, or newly drilled wells, which according to the teachings of this invention, can be used to inject the micellar solution into damming position along the line DE in the fresh water aquifer. Letters X, Y, and Z represent water injection wells presently employed in some encroachment inhibition systems discussed in this application.

Methods of preventing salt water encroachment in areas such as southern California are depicted in FIGS. 1 and 2. Pumping wells A, B, C, etc., are sunk into fresh water aquifers along the line DE, where saline water has intruded. A plurality of fresh water injection wells X, Y, Z are sunk into the fresh water aquifer upstream or ahead of the line to which the saline water has intruded. By pumping fresh water into the aquifers by means of the injection wells X, Y, Z and by extracting a like amount of water from the pumping wells A, B, C, it is sought to keep that portion of the aquifer between the wells filled with fresh water and to maintain the flow F, of such water downstream or in opposition to the flow S, of such intruding saline water, thereby stopping brine intrusion. To date, the effectiveness of the above-mentioned method is questionable, as it requires constant injection of great quantities of fresh water into the aquifer. Furthermore, due to the tendency of water to seek out and establish channels in aquifers, it is anticipated that the end result will be the establishment of outflowing channels of fresh water in the aquifers between injection and pumping wells. The intrusion of saline water into the aquifers, between the fresh water channels will continue and this intrusion will eventually progress beyond or upstream of the injection wells.

SUMMARY OF INVENTION

Applicant has discovered a method of inhibiting saline water intrusion into fresh water aquifers by injecting a micellar solution into the aquifer, preferably between the fresh water and the intruding saline water.

When the saline water contacts the micellar solution, an increase in viscosity is realized. Again referring to FIGS. 1 and 2 it is seen that a "slugging" effect can be accomplished to prevent encroachment of saline water into the fresh water aquifer along the line DE. Also the micellar solution can be used to provide a "cutoff" in a fresh water aquifer which serves to dam the normal outward flow F of fresh water, thus, the water level in the aquifer can be maintained at a sufficient head to oppose and overcome the intrusion of saline water S entering the aquifer downstream from the cutoff. The micellar solution can also be used to plug an existing salt water aquifer.

DESCRIPTION OF THE INVENTION

The micellar solution is comprised of hydrocarbon, aqueous medium and surfactant. Optionally, cosurfactant (also identified as semipolar organic compound and cosolubilizer) and/or electrolyte can be incorporated. Examples of volume amounts include from about 30 percent or less to about 85 percent of hydrocarbon, from about 10 percent to greater than about 60 percent water, at least about 4 percent surfactant, from about 0.01 percent to about 20 percent cosurfactant, and from about 0.001 percent to about 5 percent by weight of electrolyte (based on the aqueous medium).

Examples of useful hydrocarbons include most petroleum base hydrocarbons, e.g. crude oil, fractions of crude oil such as gasoline, kerosene, crude column overheads, etc.; refined fraction of crude oil such as benzene, substituted aryl compounds, etc.; synthesized hydrocarbons such as halogenated hydrocarbons, substituted aliphatic and aromatic compounds, etc.

Useful cosurfactants include alcohols, ketones, aldehydes, amino compounds, esters and like materials containing up to 20 or more carbon atoms. Examples include ethanol, isopropanol, i- and n-butanol, amyl alcohols, hexanols, cyclohexanol, cresol, phenol, substituted phenols, and crude alcohols such as fusel oil.

The surfactant can be nonionic, cationic, and anionic. Examples of useful surfactants include those taught in U.S. Pat. No. 3,254,714 to Gogarty, et al.

Preferably the surfactant is anionic, e.g. alkyl-aryl sulfonates, particularly alkyl-naphthenic monosulfonates, wherein the alkyl radial contains from about 10 to about 20 carbon atoms. The sodium salts of dialkylsuccinates are also desirable surfactants. More preferably, the surfactant is a sodium or ammonium petroleum sulfonate having an average equivalent weight within the range of from about 350 to about 525. It is preferred that the alkyl radicals of the succinate compounds contain from about 6 to about 10 carbon atoms.

The micellar solution can be injected into the aquifer at sufficient pressure to lift the overburden. The pressure can then be released and the overburden will settle and exert its pressure onto the micellar solution deposited in the aquifer so as to form a tight seal. However, in most applications the injection pressure will not exceed the "fracturing" pressure of the formation.

It is desired to use established wells A, B, C, along lines such as DE of FIG. 1 where it is desired to establish a cutoff in a fresh aquifer; however, wells can be drilled for injection purposes. The injection of the micellar solution into the aquifer can be carried out in a sequential order or injected at one time.

The above merely describes the typical preferred embodiments of carrying out the invention. The invention is not to be limited by these specific details; rather, all modifications and variations obvious to those skilled in the art are meant to be included within the invention as defined in the specification and appended claims.

EXAMPLE I

Micellar solutions defined in Table 1 are prepared from ammonium petroleum sulfonate (average MW=410, about 62 percent active sulfonate), water (contains indicated salinity), isoproponal and indicated hydrocarbon. Viscosities of the micellar solutions are indicated in Table 1. Upon contact with saline water, the viscosities are drastically increased as indicated in Table 1:

TABLE 1

| Micellar solution | Water, vol. percent | Water salinity, mg./100 ml. water | Isopropyl alcohol, vol. percent | Sulfonate, vol. percent | Hydrocarbon Vol. percent | Hydrocarbon Type | Viscosity cp., 72° F. | Saline water with which micellar solution is contacted | Final or resultant slug vis., cp., 72° F. |
|---|---|---|---|---|---|---|---|---|---|
| A | 29.4 | 830, NaC | 2.0 | 13.7 | 54.9 | SLSRG [1] | 24 | HPW [2] | ca. 500 |
| B | 29.4 | 420, NaCl | 2.0 | 11.6 | 57.0 | Heavy naphtha | 19.7 | HPW [2] | ca. 500 |
| C | 29.6 | 420, NaCl | 1.2 | 11.8 | 57.4 | SLSRG [1] | ca. 25 | HPW [2] | ca. 1,000 |
| D | 29.6 | 1,670, NaCl | 1.2 | 11.8 | 57.4 | SLSRG [1] | ca. 40 | HPW [2] | ca. 860 |
| E | 34.8 | 4.3, Na$_2$SO$_4$ | 0.5 | 8.1 | 56.6 | SLSRG [1] | 50.2 | HPW [2] | >1,000 |

[1] Stabilized Light Straight Run Gasoline.
[2] Henry Plant Water (obtained from the Levi Henry lease near Robinson, Ill.) contains about 20,000 p.p.m. total dissolved solids.

The micellar solution is injected into the aquifer through a suitable well structure. Upon contact with a brine solution it becomes very viscous. Fresh water aquifers which are subject to saline water intrusion are ordinarily relatively close to the earth's surface. Hence, cost of drilling and establishing wells for the injection of micellar solution should not be unduly prohibitive in the light of the conservation of the fresh water that is to be effected.

In the preferred embodiment of this invention, it is desired to establish the cutoff along a line DE extending transverse to the aquifer. This can be accomplished using two wells such as AB, AC, BC, etc. One well is located at one end of the line DE along which it is desired to establish the cutoff, and the other well is located at the other end of the line. One well is employed to inject the micellar solution into the formation and the other is employed to pump water from the aquifer during the injection process. The pressure in the aquifer in and around the second or producing well opposite the first or injection well is lowered and the flow of water in the aquifer in close proximity to the second or producing well flows toward said producing well thereby inducing and causing the micellar solution injected into the first or injection well to flow towards said second well. It is apparent that the provision of the second producing well is effective to reduce to a minimum the required volume of micellar solution. In addition to reducing the costs, it provides a positive means of reading and controlling the process. The producing well can also become a micellar solution injection well as the process is carried on. It is also apparent that the second producing well must be sufficiently close to the injection well to obtain the desired lowering of pressure and the desired direction of flow of water and micellar solution in the formation. Accordingly, in situations where it is desired to establish a cutoff of considerable longitudinal extent, a plurality of wells may be used in series along the line on which it is desired to establish the cutoff. It is also to be understood that the micellar solution can be introduced into the formation under considerable pressure so as to obtain the necessary penetration.

It will be apparent that in practice, particularly in aquifers of great vertical depth, the cutoff or cutoffs need not extend from the lower or substrata to the overlying or superstrata. But, the cutoff(s) may be established to extend from the lower or substrata upwardly, or from the upper to the lower strata, a sufficient distance to inhibit or stop the flow of water in a portion of the aquifer to a sufficient extent to change the water table necessary to stop saline water intrusion. This, of course, depends upon the specific geology of the aquifer.

I claim:

1. A method of inhibiting the advance of saline water into a substantially horizontally extending fresh water aquifer between substantially impermeable strata in the earth which comprises, injecting into the aquifer a micellar solution capable of producing a viscous mixture upon contact with the saline water, said micellar solution becoming viscous upon contact with the saline water to establish a blocking material in the aquifer to inhibit the advance of the intruding saline water.

2. The method of claim 1 wherein said micellar solution is injected into the aquifer through at least one injection well and positioned in the aquifer by controlling the removal of fluids from at least one other well in fluid communication with the aquifer so as to induce said blocking material to flow into blocking position.

3. A method of inhibiting the advance of saline water into a fresh water aquifer extending substantially horizontally between substantially impermeable sub and superstrata in the earth's formation and having at least one injection means in fluid communication with the aquifer, the method comprising injecting into the aquifer in advance of the intruding saline water a sufficient amount of micellar solution to form a bridging mass traverse of the intruding saline water, permitting the saline water to contact the micellar solution whereupon a viscous material is formed and the intrusion of saline water is inhibited.

4. The method of claim 3 wherein repeated amounts of micellar solution are injected into the aquifer to maintain the viscous blocking effect.

5. The method of claim 3 wherein the micellar solution is oil-external and is prepared with a petroleum sulfonate having an average equivalent weight within the range of from about 350 to about 525.

6. The method of claim 3 wherein the micellar solution contains by volume from about 30 percent to about 85 percent hydrocarbons; from about 10 percent to about greater than 60 percent water and at least about 4 percent surfactant.

7. The method of claim 6 wherein the micellar solution contains from about 0.01 percent to about 20 percent cosurfactant and/or from about 0.001 percent to about 5 percent of weight of electrolyte (based on the aqueous medium).

UNITED STATES PATENT OFFICE
CERTIFICATE OF CORRECTION

Patent No. 3,587,737                 Dated 6/28/71

Inventor(s) William C. Tosch

It is certified that error appears in the above-identified patent and that said Letters Patent are hereby corrected as shown below:

| | |
|---|---|
| Col. 2, line 62: | Delete "radial" and insert --radical--. |
| Col. (Table I) line 8: | Delete "830,NaC" and insert --830,NaCl--. |

Signed and sealed this 2nd day of November 1971.

(SEAL)
Attest:

EDWARD M. FLETCHER, JR.
Attesting Officer

ROBERT GOTTSCHALK
Acting Commissioner of Patents